(12) United States Patent
Johnston

(10) Patent No.: US 11,793,297 B1
(45) Date of Patent: Oct. 24, 2023

(54) SENSORY-FRIENDLY EYEWEAR HOLDER

(71) Applicant: THAT GIRL AMBER, LLC, Marquette, MI (US)

(72) Inventor: Amber Johnston, Marquette, MI (US)

(73) Assignee: THAT GIRL AMBER, LLC, Marquette, MI (US)

( * ) Notice: Subject to any disclaimer, the term of this patent is extended or adjusted under 35 U.S.C. 154(b) by 0 days.

(21) Appl. No.: 18/062,566

(22) Filed: Dec. 6, 2022

(51) Int. Cl.
*A45F 5/02* (2006.01)
*G02C 3/00* (2006.01)

(52) U.S. Cl.
CPC .............. *A45F 5/02* (2013.01); *G02C 3/006* (2013.01); *A45F 2200/0541* (2013.01)

(58) Field of Classification Search
CPC ........ A45F 2200/0541; A45F 2005/006; A45F 5/022; A41D 13/0012; A41D 13/0007; A41D 2400/48; Y10T 24/1371; Y10T 24/1374; G02C 3/006; G02C 3/003
USPC ................ 224/220, 254, 255, 575–576, 260; 24/3.13
See application file for complete search history.

(56) References Cited

U.S. PATENT DOCUMENTS

| | | | |
|---|---|---|---|
| 3,450,467 A * | 6/1969 | Phillips | G02C 3/003 351/156 |
| 3,879,804 A * | 4/1975 | Lawrence | G02C 3/003 24/3.3 |
| 5,092,668 A * | 3/1992 | Welch | G02C 3/006 351/123 |
| 5,893,198 A | 4/1999 | Decotis | |
| 6,935,742 B1 | 8/2005 | Wilson, Sr. | |
| 7,192,136 B2 * | 3/2007 | Howell | G02C 11/10 351/158 |
| 7,427,133 B2 * | 9/2008 | Carter | G02C 3/006 351/158 |
| 8,942,403 B2 * | 1/2015 | Oman | H01R 31/005 381/364 |
| 9,420,858 B2 * | 8/2016 | Rafaelian | A44C 15/005 |
| 2007/0070291 A1 * | 3/2007 | Su | G02C 3/003 351/156 |
| 2010/0283960 A1 | 11/2010 | Berdou | |
| 2011/0019861 A1 * | 1/2011 | Wolfe | A41D 1/005 381/384 |
| 2016/0025996 A1 | 1/2016 | Bacon | |
| 2019/0269184 A1 | 9/2019 | Gracie | |

FOREIGN PATENT DOCUMENTS

| | | |
|---|---|---|
| BR | 202013001781 U2 | 2/2016 |
| CN | 2842468 Y * | 9/2005 |
| GB | 2212293 B | 6/1991 |
| JP | 3104855 U | 10/2004 |
| WO | WO9840780 A1 | 9/1998 |
| WO | WO2007135543 A2 | 11/2007 |
| WO | WO2018207473 A1 | 11/2018 |

* cited by examiner

*Primary Examiner* — Adam J Waggenspack
(74) *Attorney, Agent, or Firm* — Pamela Cascone Ball; Romulo H. Delmendo; Jeanette M. Braun

(57) ABSTRACT

Sensory-friendly eyewear holders that can be incorporated into a garment, and garments comprising such sensory-friendly eyewear holders are provided herein. The sensory-friendly eyewear holder, or garment comprising the sensory-friendly eyewear holder, eliminates body contact with the eyewear holder to provide sensory relief to eyewear wearers when storing the eyewear for those who have sensory issues.

19 Claims, 4 Drawing Sheets

SENSORY-FRIENDLY EYEWEAR HOLDER

FIELD OF THE DISCLOSURE

The present disclosure relates generally to eyewear holders, and more particularly, to sensory-friendly eyewear holders that can be incorporated into a garment, and garments comprising such sensory-friendly eyewear holders, where the sensory-friendly eyewear holder, or a garment comprising the sensory-friendly eyewear holder, eliminates body contact with the eyewear holder, thus providing sensory relief to wearers who have sensory issues.

BACKGROUND OF THE DISCLOSURE

Since the introduction of wearable vision aids or vision aids held to the face, such as eyewear, spectacles and monocles, wearers have had issues with losing their vision aid or keeping them close at hand. Products are available to help wearers keep vision aids, such as eyewear, on their person. Popular products include eyewear holders that go around the neck to hold eyewear, often a cord-type or decorative necklace-type holder.

People with sensory issues, however, have many sensitivities such as aversions to items touching their skin or to the sensation of weight. It is unbearable for them to wear a cord or necklace that contacts their skin. Such users cannot employ wearable cord-type and necklace-type eyewear holders that rest on the skin. Placing the cord-type or necklace-type eyewear holders over a garment, such that the eyewear holder is not in direct contact with the skin, is not a solution for many of those with sensory issues as even the weight of the cord-type or necklace type eyewear through the garment is intolerable.

Individuals with sensory issues who wear eyewear lack a wearable, sensory-friendly option to securely hold their eyewear and to keep them from losing their eyewear. Conventional cord-type or necklace type eyewear holders are unsuitable for these users due to their aversion to skin contact with the holder or to the sensation of weight on their body, such as weight around their neck.

Thus, there is a need in the art for wearable, sensory-friendly eyewear holders that are not worn next to the skin and do not place weight around the neck of the wearer.

SUMMARY OF THE DISCLOSURE

In one aspect, the present disclosure is directed to a wearable, sensory-friendly eyewear holder comprising pre-formed loops providing sensory relief to a wearer. The sensory-friendly eyewear holder with pre-formed loops comprises a string comprising a first end and a second end, wherein each of the first end and second end comprises adjustable loop-shaped sections, such as pre-formed loop-shaped sections. The string is a length of cord comprising a first pre-formed loop-shaped section at the first end and a second pre-formed loop-shaped section at the second end. The string further comprises an adjustment sleeve or collar adjacent to the first pre-formed loop-shaped section and the second pre-formed loop-shaped section to allow for the size adjustment of a first pre-formed loop at the first pre-formed loop-shaped section and a second pre-formed loop at the second preformed loop-shaped section. The sensory-friendly eyewear holder comprising pre-formed loops may be threaded through and housed within the casing or channel of a garment.

In another aspect, the present disclosure is directed to a wearable, sensory-friendly eyewear holder lacking pre-formed loop sections providing sensory relief to a wearer. The sensory-friendly eyewear holder comprises a string comprising a first end and a second end. The string is a length of cord comprising a first loop-forming adjustment ring secured to the first end and second loop-forming adjustment ring secured to the second end. The loop-forming adjustment ring allows arrangement of the cord to form a loop and further allows for the adjustment of the size of the loop formed by the loop-forming adjustment ring. The sensory-friendly eyewear holder may be threaded through and housed within the casing or channel of a garment.

In another aspect, the present disclosure is directed to a garment comprising a sensory-friendly eyewear holder. The garment may be fashioned with a casing or channel integral to a hood, where the hood may be attached to the garment, and where the casing or channel may house the sensory-friendly eyewear holder. In another aspect, the garment may be fashioned with a casing or channel integral to a neckband, where the garment may be a hooded or hoodless garment, and where the casing or channel may house the sensory-friendly eyewear holder.

BRIEF DESCRIPTION OF THE DRAWINGS

The preferred embodiments of the disclosure will hereinafter be described in conjunction with the appended drawings provided to illustrate and not to limit the disclosure, where like designations denote like elements, and in which.

Like reference numerals refer to like parts throughout the several views of the drawings.

DETAILED DESCRIPTION

Figure 1:
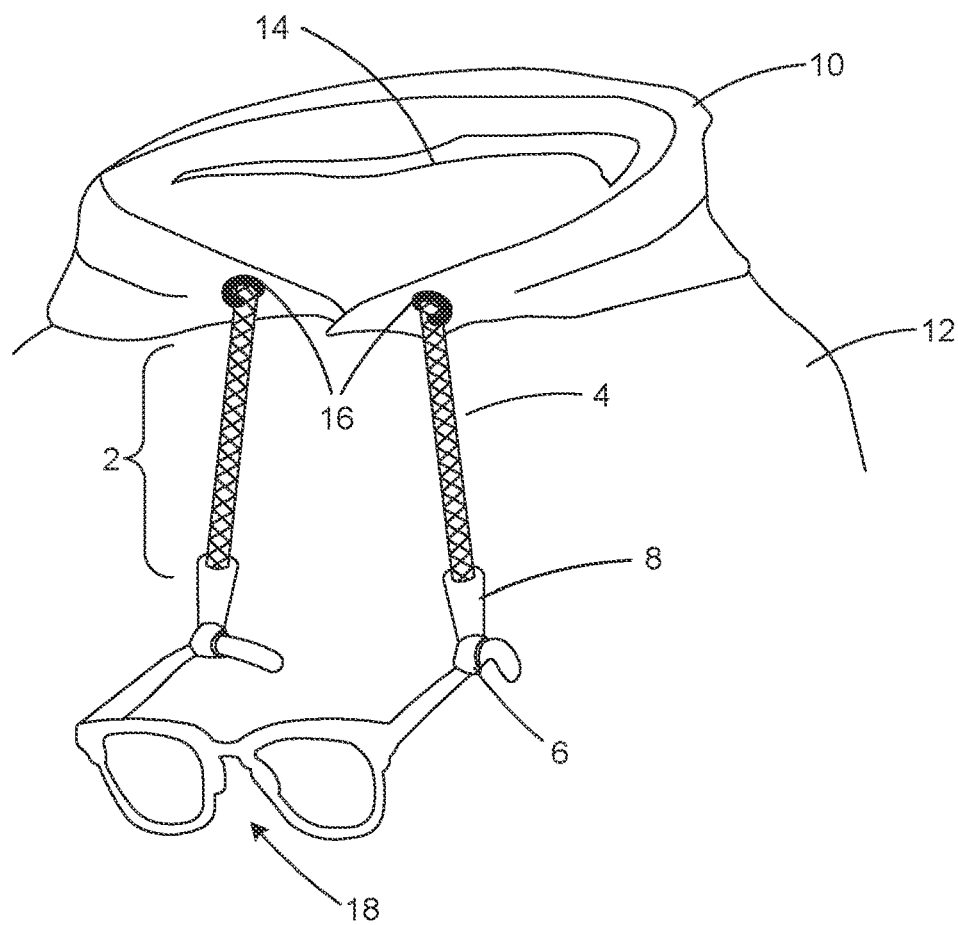
FIG. 1 presents a perspective view of an exemplary aspect of a hooded garment comprising a sensory-friendly eyewear holder comprising pre-formed loops as described in the disclosure.
Figure 6:
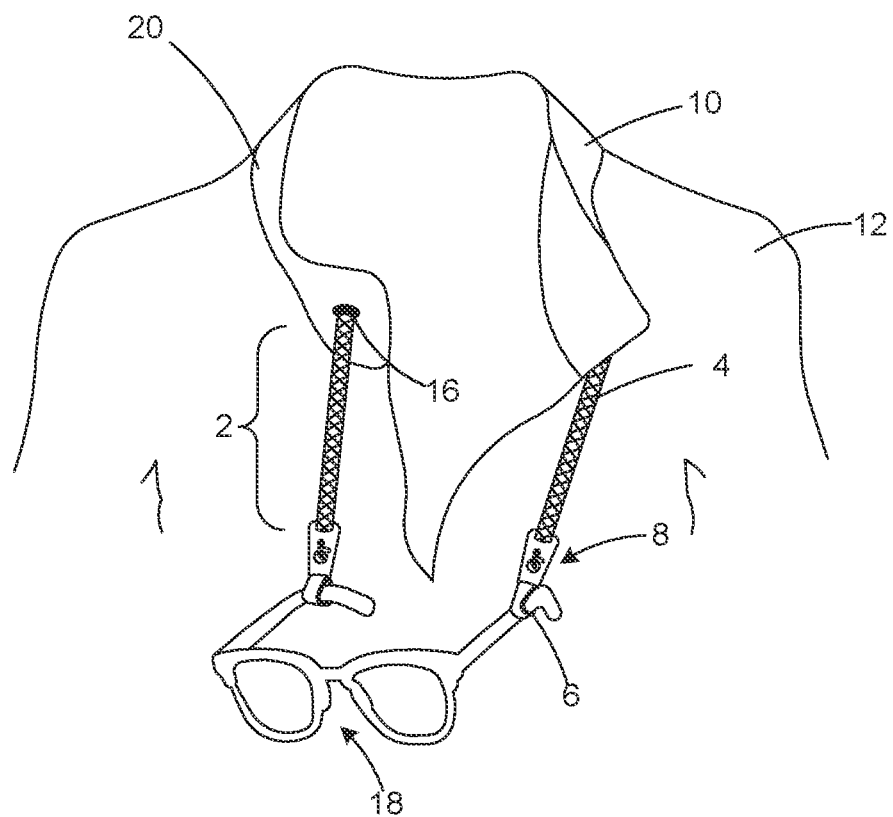
FIG. 6 presents a perspective view of an exemplary aspect of a hoodless garment comprising a sensory-friendly eyewear holder of FIG. 1.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All the implementations described below are exemplary implementations provided to enable persons skilled in the art to make or use the embodiments of the disclosure and are not intended to limit the scope of the disclosure, which is defined by the claims. For purposes of description herein, the terms "threaded," "encased," "secured within", "housed", "surrounds", "surrounding", "extending from" and derivatives thereof shall relate to the disclosure as illustrated in FIGS. 1 and 6.

Furthermore, there is no intention to be bound by any expressed or implied theory presented in the preceding technical field, background, brief summary, or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Individuals with sensory issues may experience difficulty with many every day occurrences such as sound, light, touch, or excitement. Individuals with sensitivity to touch may experience difficulty wearing certain types of clothing, feeling the sensation of weight on their body, or enduring contact with items touching their skin. As such, individuals with sensory issues who wear eyewear cannot utilize the cord-type or decorative necklace-type eyewear holders that many other individuals wear to keep their eyewear and eyewear handy and secure. The sensory-friendly eyewear holder of the disclosure offers relief to individuals with such sensitivities, for example, sensitivity to having items such as jewelry or cording touching their skin or sensitivity to the sensation of weight on their body.

Shown throughout the figures, the present disclosure is directed toward sensory-friendly eyewear holders which may provide sensory relief to a wearer.

Referring to FIGS. 1-6, the sensory-friendly eyewear holder 2 comprising a pre-formed loop 6, is illustrated in accordance with a first exemplary embodiment of the present disclosure. As shown in FIG. 1, the sensory-friendly eyewear holder 2 includes a string fashioned from cording 4, where the cording includes a pre-formed loop-shaped section 6 at one or both ends, and an adjustment collar or sleeve 8 (hereinafter "adjustment sleeve 8"). As shown in FIG. 1, the sensory-friendly eyewear holder 2 may be housed within the casing or channel 10 of a garment 12 comprising a hood 14 where the sensory-friendly eyewear holder 2 comprising a pre-formed loop 6 extends beyond one or both openings 16 in the channel 10. As shown in FIG. 1, the sensory-friendly eyewear holder 2 comprising a pre-formed loop 6 may be utilized to securely hold an item, such as a pair of eyewear 18 or other eyewear.

Figure 2:
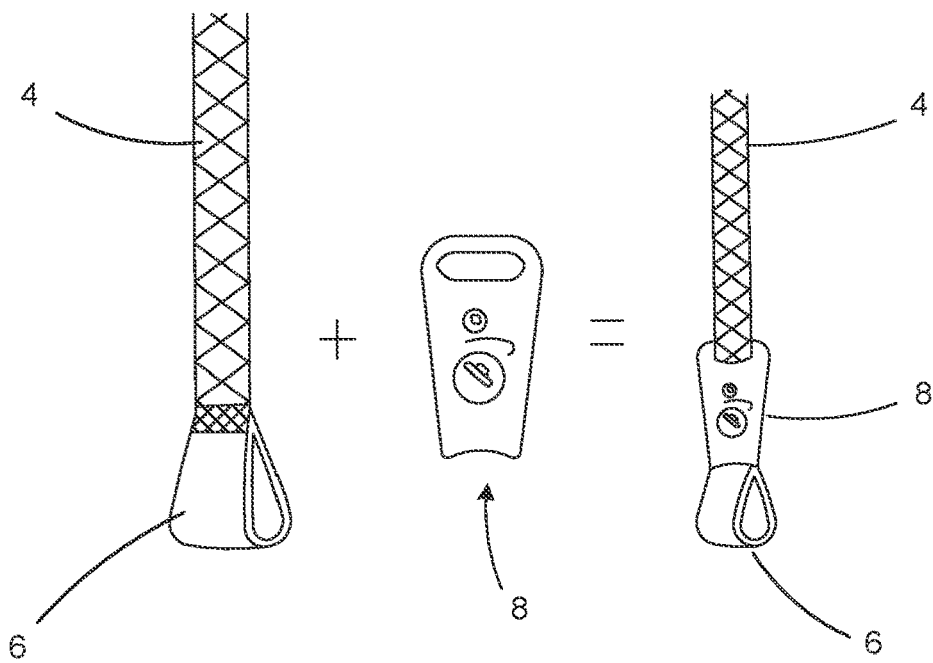
FIG. 2 presents a perspective view of an exemplary aspect of a portion of the string comprising the string fashioned from cording, a pre-formed loop-shaped section, and an adjustment sleeve of the sensory-friendly eyewear holder of FIG. 1.

Referring to FIG. 2, the string fashioned from cording 4 comprises a pre-formed loop-shaped section 6. An adjustment sleeve 8 surrounds the string fashioned from cording 4 and is located adjacent to the pre-formed loop-shaped section 6.

Figures 3A, 3B:
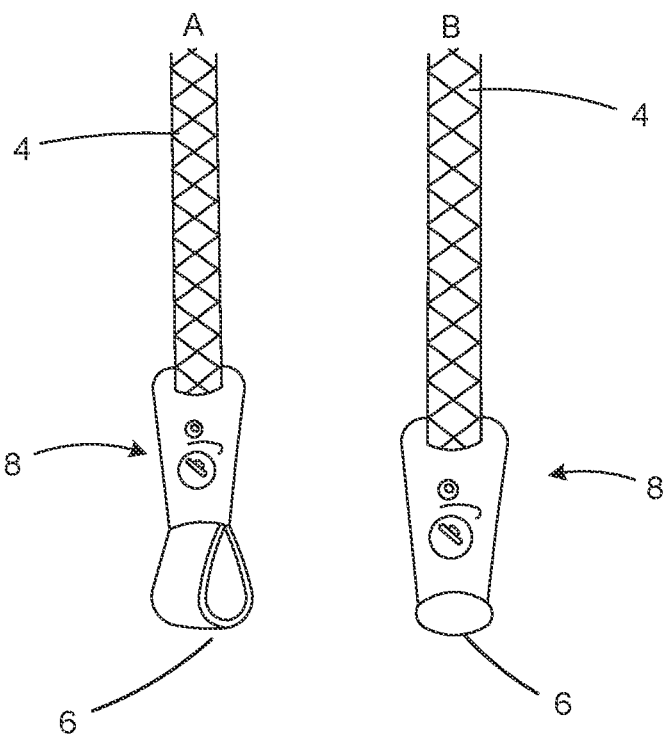
FIG. 3A presents a perspective view of an exemplary aspect of the string, a pre-formed loop-shaped section, and an adjustment sleeve of the sensory-friendly eyewear holder of FIG. 1 in an open (A)
FIG. 3B presents a perspective view of an exemplary aspect of the string, a pre-formed loop-shaped section, and an adjustment sleeve of the sensory-friendly eyewear holder of FIG. 1 in a closed (B) configuration.

Referring to FIG. 3, the adjustment sleeve 8 surrounding the string fashioned from cording 4 may be positioned such that the pre-formed loop-shaped section 6 may be open as shown in FIG. 3A or closed as shown in FIG. 3B.

Figure 4:
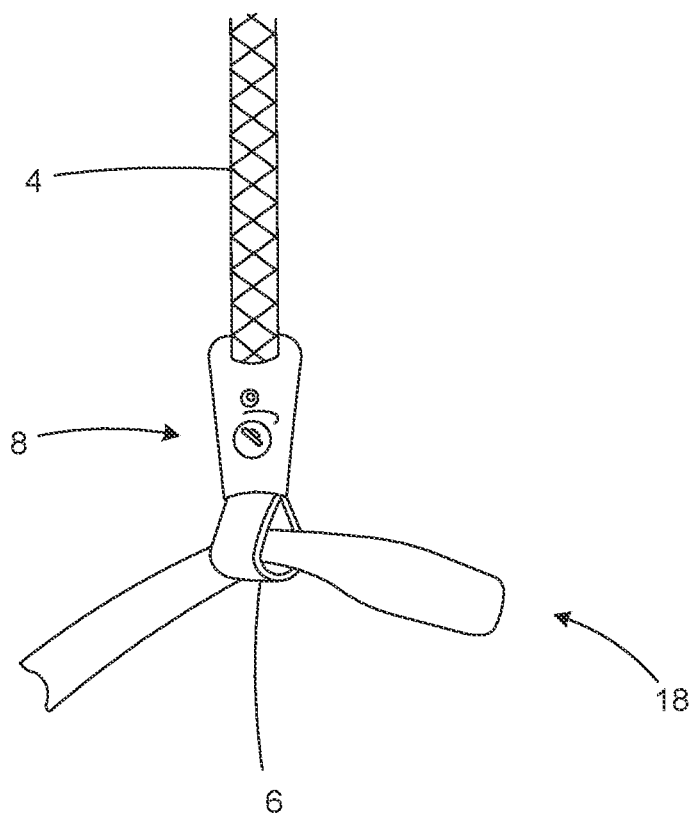
FIG. 4 presents a perspective view of an exemplary aspect of the string, a pre-formed loop-shaped section, and an adjustment sleeve of the sensory-friendly eyewear holder of FIG. 1 in a closed configuration surrounding the arm of a pair of eyewear.

Referring to FIG. 4, the arm of a pair of eyewear 18 is shown secured within in a pre-formed loop-shaped section 6 of the string fashioned from cording 4 where the adjustment sleeve 8 is positioned to close the pre-formed loop-shaped section 6 securely around the arm of a pair of eyewear 18.

Figure 5:
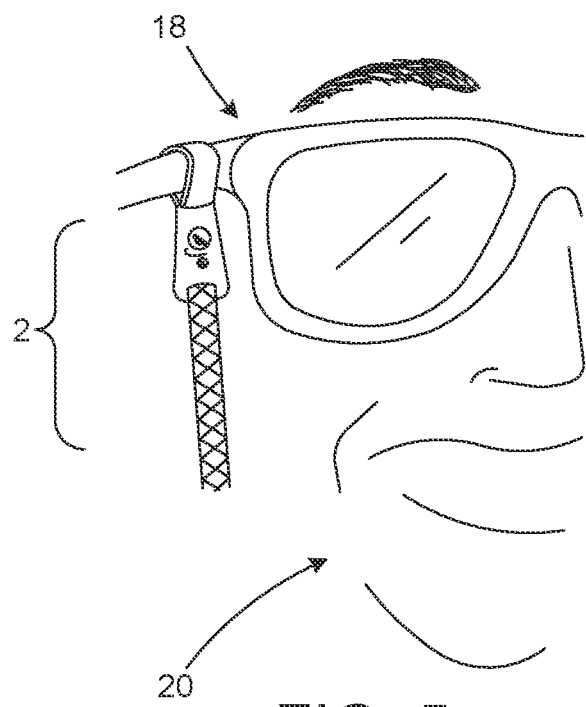
FIG. 5 presents a perspective view of an exemplary aspect of a user wearing the sensory-friendly eyewear holder of FIG. 1.

Referring to FIG. 5, the sensory-friendly eyewear holder 2 is shown on an individual wearing a pair of eyewear 18 securely attached to the sensory-friendly eyewear holder 2 comprising a pre-formed loop 6.

Referring to FIG. 6, the sensory-friendly eyewear holder 2 comprising a pre-formed loop-shaped section 6 may be housed within the casing or channel 10 in the neckband 20 of a garment 12 lacking a hood, where the sensory-friendly eyewear holder 2 comprising a pre-formed loop-shaped section 6 extends beyond one or both openings 16 in the channel 10. As shown in FIG. 6, the sensory-friendly eyewear holder 2 comprising a pre-formed loop-shaped section 6 may be utilized to securely hold an item, such as eyewear 18.

Figures 7A, 7B, 7C:
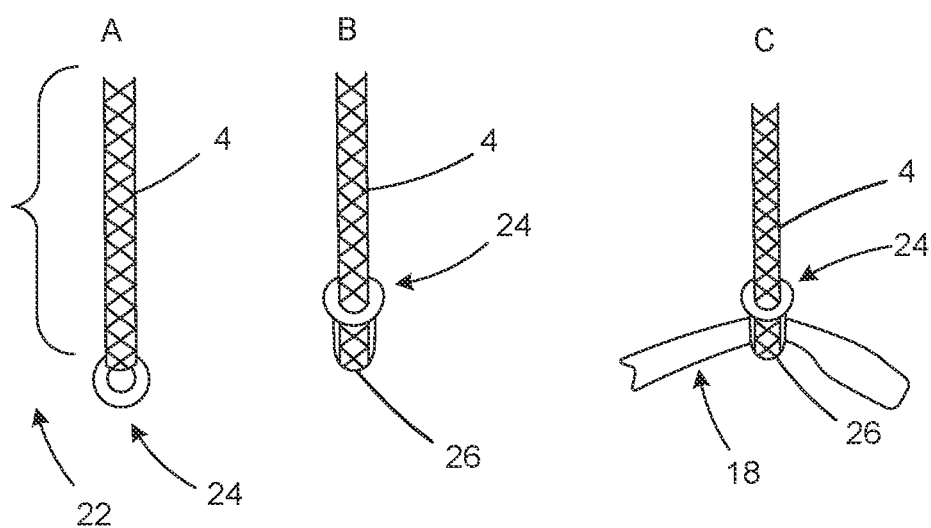
FIG. 7A presents a perspective view of an exemplary aspect of a portion of the string comprising the string fashioned from cording and a loop-forming adjustment ring of a sensory-friendly eyewear holder in an unformed loop configuration (A)
FIG. 7B presents a perspective view of an exemplary aspect of a portion of the string comprising the string fashioned from cording and a loop-forming adjustment ring of a sensory-friendly eyewear holder in an open formed-loop configuration (B)
FIG. 7C presents a perspective view of an exemplary aspect of a portion of the string comprising the string fashioned from cording and a loop-forming adjustment ring of a sensory-friendly eyewear holder in a closed formed-loop configuration (C) surrounding the arm of a pair of eyewear.

Referring to FIG. 7, the sensory-friendly eyewear holder 22 comprises a string fashioned from cording 4 and a loop-forming adjustment ring 24. The sensory-friendly eyewear holder 22 is shown in an unformed configuration (FIG. 7A), in an open formed-loop configuration 26 (FIG. 7B) and in a closed formed-loop configuration 26 surrounding the arm of a pair of eyewear 18 (FIG. 7C).

In one embodiment, the present disclosure is directed to a sensory-friendly eyewear holder 2 comprising a pre-formed loop 6 (referred to hereinafter as SF eyewear holder 2) suitable for providing sensory relief to an individual. The SF eyewear holder 2 is fashioned from a string fashioned from cording 4 where the cording comprises a pre-formed loop-shaped section 6 at one or both ends. The string fashioned from cording 4 also comprises an adjustment sleeve 8 adjacent to each pre-formed loop-shaped section 6 to allow for secure adjustment of the size of the loop. The SF eyewear holder 2 may be threaded through and housed within the channel 10 of a garment 12.

The cording of the string fashioned from cording 4 may be any type of cording suitable for the intended use. The cording may be of any conformation such as, but not limited to, flat, round, semi-round, semi-flat, triangular, or square in cross-sectional conformation. The material comprising the cording may be of any material suitable for the intended use, such as but not limited to, cotton, linen, wool, hemp, rayon, nylon, elastic, tencel, polyester, or any combination thereof. Further, the material comprising the cording may be non-stretchable, partially stretchable, or fully stretchable. The structure of the cording may be of any type structure such as woven, non-woven, twisted, webbed, knitted, spun and the like.

In one aspect of the disclosure, the cording comprising the string fashioned from cording 4 and the cording comprising the pre-formed loop-shaped section 6 are the same cross-sectional conformation and same material. In one aspect, the cording comprising the string fashioned from cording 4 and the cording comprising the pre-formed loop-shaped section 6 is round, partially stretchable cotton.

In another aspect of the disclosure, the cording comprising the string fashioned from cording 4 and the cording comprising the pre-formed loop-shaped section 6 are different cross-sectional conformations. In one aspect, the cording comprising the string fashioned from cording 4 may be round and the cording comprising the pre-formed loop-shaped section 6 may be flat.

In another aspect of the disclosure, the cording comprising the string fashioned from cording 4 and the cording comprising the pre-formed loop-shaped section 6 are different materials. In one aspect, the cording comprising the string fashioned from cording 4 may be cotton and the cording comprising the pre-formed loop-shaped section 6 may be nylon.

In yet another aspect of the disclosure, the cording comprising the string fashioned from cording 4 and the cording comprising the pre-formed loop-shaped section 6 are different cross-sectional conformations and different materials. In one aspect, the cording comprising the string fashioned from cording 4 may be round cotton and the cording comprising the pre-formed loop-shaped section 6 may be flat nylon.

The adjustment sleeve 8 adjacent to each pre-formed loop-shaped section 6 may be fashioned from any material capable of securely adjusting the size of the pre-formed loop-shaped section 6 as adjusted by the wearer to securely hold a pair of eyewear 18 or other lightweight object. The adjustment sleeve 8 surrounding the string fashioned from cording 4 is typically moved by sliding the adjustment sleeve 8 up and or down along the cording 4. The adjustment sleeve 8 may be any shape suitable for surrounding the string fashioned from cording 4 such as, but not limited to, oval, round, square, rectangular, triangular, trapezoidal, or tubular. The adjustment sleeve 8 is formed from any material suitable for allowing for secure adjustment of the size of the pre-formed loop-section 6 of the SF eyewear holder 2. In one aspect, the adjustment sleeve 8 is of a flexible material. The flexible material may be any flexible material such as silicone, rubber, flexible plastic, and the like. In another aspect, the adjustment sleeve 8 is of an inflexible material. The inflexible material may be wood, metal, silicone-lined wood, e.g., a silicone-lined wooden bead, silicone-lined metal, e.g., a silicone-lined metal bead, inflexible silicone, inflexible rubber, inflexible plastic, and the like. In yet another aspect, the adjustment sleeve 8, may further comprise a spring mechanism. An exemplary adjustment sleeve 8 can be a product known as a toggle cord lock. Other suitable devices are also within the scope of the present invention.

The SF eyewear holder 2 may be of many sizes and lengths. In one aspect, the diameter of the SF eyewear holder 2 is a diameter allowing the SF eyewear holder 2 and all associated components to be threaded through and housed within the channel 10 of a garment 12. In one aspect, the length of the SF eyewear holder 2 is a length by which one or both ends of the string fashioned from cording 4 extend beyond one or both openings 16 in the casing or channel 10 of the garment 12. In one aspect, the length of the SF eyewear holder 2 is any length by which both ends of the string fashioned from cording 4 extend beyond both openings 16 in the casing or channel 10 of the garment 12.

In one aspect, where both ends of the string fashioned from cording 4 extend beyond both openings 16 in the casing or channel 10 of the garment 12, each adjustable pre-formed loop-shaped section 6 and adjustment sleeve 8 may be configured such that each arm of a pair of eyewear 18 may be secured, one in each adjustable pre-formed loop-shaped section 6. The user may secure a pair of eyewear 18 by first sliding the adjustment sleeve 8 along the string fashioned from cording 4 away from the pre-formed loop-shaped sections 6 to place the pre-formed loop-shaped sections 6 in an open position (FIG. 3A). The user would then place the arms of the eyewear 18 through the open pre-formed loop-shaped sections 6 and then slide the adjustment sleeves 8 along the string fashioned from cording 4 towards the pre-formed loop-shaped sections 6 to close the pre-formed loop-shaped sections 6 and secure the arms of the eyewear or eyewear 18 (FIG. 3B and FIG. 4).

In another embodiment, the present disclosure is directed to a sensory-friendly eyewear holder 22 lacking a pre-formed loop (referred to hereinafter as SF eyewear holder 22) suitable for providing sensory relief to an individual. The SF eyewear holder 22 is fashioned from a string fashioned from cording 4. The string fashioned from cording 4 comprises a first loop-forming adjustment ring 24 secured to the first end and second loop-forming adjustment 24 ring secured to the second end. The first loop-forming adjustment 24 ring allows arrangement of the string fashioned from cording 4 to form a first loop 26 and the second loop-forming adjustment ring 24 allows arrangement of the string fashioned from cording 4 to form a second loop 26. The first loop-forming adjustment ring 24 allows for the size adjustment of the first formed loop 26 and the second loop-forming adjustment ring 24 allows for the size adjustment of the second formed loop 26. The SF eyewear holder 22 may be threaded through and housed within the channel 10 of a garment 12.

The cording of the string fashioned from cording 4 may be any type of cording suitable for the intended use. The cording may be of any conformation such as, but not limited to, flat, round, semi-round, semi-flat, triangular, or square in cross-sectional conformation. The material comprising the cording may be of any material suitable for the intended use, such as but not limited to, cotton, linen, wool, hemp, rayon, nylon, elastic, tencel, polyester, or any combination thereof. Further, the material comprising the cording maybe non-stretchable, partially stretchable, or fully stretchable. The structure of the cording may be of any type structure such as woven, non-woven, twisted, webbed, knitted, spun, and the like. In one aspect, the cording comprising the string fashioned from cording 4 is round, partially stretchable cotton.

The loop-forming adjustment ring 24 secured to each of the termini of the string fashioned from cording 4 may be fashioned from any material capable of securely forming and adjusting the size of the loop 26 as adjusted by the wearer to securely hold a pair of eyewear 18 or other lightweight object. A loop 26 is formed by passing or threading the string fashioned from cording 4 through the opening of the loop-forming adjustment ring 24 secured to each of the termini of the string fashioned from cording 4. The size of the loop 26 formed may be adjusted by threading more or less string fashioned from cording 4 through the loop-forming adjustment ring 24. A user then places the arm of a pair of eyewear 18 through the newly formed loop 26 and secures the arm of the eyewear 18 by pulling the string fashioned from cording 4 away from the loop-forming adjustment ring 24, thus closing the loop 26 round the arm of the eyewear 18.

The loop-forming adjustment ring 24 secured to each of the termini of the string fashioned from cording 4 may be any shape such as, but not limited to, oval, round, square, rectangular, triangular, trapezoidal, or tubular. The loop-forming adjustment ring 24 secured to each of the termini of the string fashioned from cording 4 is formed from any material suitable for allowing for secure adjustment of the size of the formed loop 26 of the SF eyewear holder 22. In one aspect, the loop-forming adjustment ring 24 secured to each of the termini of the string fashioned from cording 4 is of a flexible material. The flexible material may be any flexible material such as silicone, rubber, flexible plastic, and the like. In another aspect, the loop-forming adjustment ring 24 secured to each of the termini of the string fashioned from cording 4 is of an inflexible material. The inflexible material may be wood, metal, silicone-lined wood, e.g., a silicone-lined wooden bead, silicone-lined metal, e.g., a silicone-lined metal bead, inflexible silicone, inflexible rubber, inflexible plastic, and the like.

The SF eyewear holder 22 may be of many sizes and lengths. In one aspect, diameter of the SF eyewear holder 22 is a diameter allowing the SF eyewear holder 22 and all associated components to be threaded through and housed within the channel 10 of a garment 12. In one aspect, the length of the SF eyewear holder 22 is a length by which one or both ends of the string fashioned from the string fashioned from cording 4 extend beyond one or both openings 16 in the casing or channel 10 of the garment 12. In one aspect, the length of the SF eyewear holder 22 is any length by which both ends of the string fashioned from cording 4 extend beyond both openings 16 in the channel 10 of the garment 12.

In one aspect, where both ends of the string fashioned from cording 4 extend beyond both openings 16 in the casing or channel 10 of the garment 12, each loop 26 and the loop-forming adjustment ring 24 secured to each of the termini of the string fashioned from cording 4 may be configured such that each arm of a pair of eyewear 18 may be secured, one in each adjustable loop 26. The user may secure a pair of eyewear 18 by passing or threading the string fashioned from cording 4 through the opening of the loop-forming adjustment ring 24 secured to each of the termini of the string fashioned from cording 4 to form a loop (FIG. 7B). The user would then place the arms of the eyewear 18 through the newly formed loop 26 and secure the eyewear 18 by pulling the string fashioned from cording 4 away from the loop-forming adjustment ring 24, thus closing the loop 26 round the arm of the eyewear 18 (FIG. 7C).

The SF eyewear holder 2 or SF eyewear holder 22 is suitable for use with any garment 12 comprising a channel or casing or channel 10. In one embodiment, the present disclosure is directed to a garment 12 comprising an SF eyewear holder 2 or SF eyewear holder 22. In one aspect, the garment 12 comprises a channel 10 with openings 16 integral to a hood 14 attached to the garment 12 through which the SF eyewear holder 2 or SF eyewear holder 22 may be threaded. In one aspect, the hood 14 comprising the SF eyewear holder 2 or SF eyewear holder 22 may be attached to a hoodie, vest, or jacket. In another aspect, the hood 14 comprising the SF eyewear holder 2 or SF eyewear holder 22 is removably attached to a hoodie, vest, or jacket, for example, the hood 14 may be zippered, buttoned, laced, or attached using hook and loop closures onto the garment 12.

In yet another aspect, the channel 10 through which the SF eyewear holder 2 or SF eyewear holder 22 may be threaded is integral to the neckband of a hooded garment 12. In another aspect, the hood 14 is removably attached to a hoodie, vest, or jacket, for example, the hood 14 may be zippered, buttoned, laced, or attached using hook and loop closures onto the garment 12.

In yet another aspect, the channel 10 through which the SF eyewear holder 2 or SF eyewear holder 22 may be threaded is integral to the neckband 20 of a hoodless garment 12, for example, a vest or jacket.

The SF eyewear holder 2 or SF eyewear holder 22 disclosed herein provide many forms of relief to individuals with sensory issues. When housed within the casing or channel 10 of a hooded garment 12 or the casing or channel 10 in the neckband 20 of a hoodless garment, the SF eyewear holder 2 or SF eyewear holder 22 does not contact the skin of an individual, thus providing relief for those with an aversion to materials, such as cording or jewelry, touching their skin. As an additional benefit, the adjustment sleeves 8 of the SF eyewear holder 2 may be used to position the string fashioned from cording 4 along the arm of the eyewear 18 such that the cording 4 is held away from the temple area of the individual when wearing the eyewear 18. Likewise, the loop-forming adjustment ring 24 of the SF eyewear holder 22 may be used to position the string fashioned from cording 4 along the arm of the eyewear 18 such that the cording 4 is held away from the temple area of the individual when wearing the eyewear 18.

Further, the SF eyewear holder 2 or SF eyewear holder 22, when housed within the casing or channel 10 of a garment 12 comprising a hood 14 feels weightless, that is, the weight of the SF eyewear holder 2 or SF eyewear holder 22 is distributed across the hood 14 and garment 12 such that the wearer does not experience the sensation of having a weight or weighted item on their body, such as around their neck. When the eyewear 18 is securely held in place in the SF eyewear holder 2 or SF eyewear holder 22, the user may remove the eyewear 18 yet still have the eyewear 18 safely on their person. When the SF eyewear holder 2 or SF eyewear holder 22 is threaded through the casing or channel 10 of a garment 12 comprising a hood 14, for example, a hoodie, the user may wear their eyewear in comfort with the hood down or up around their head.

In a similar fashion, the SF eyewear holder 2 or SF eyewear holder 22, when housed within the channel 10 of the neckband 20 of a hoodless garment 12 feels weightless, that is, the weight of the SF eyewear holder 2 or SF eyewear holder 22 is distributed across the neckband and garment 12 such that the wearer does not experience the sensation of having a weight or weighted item on their body, such as around their neck. When the eyewear 18 are securely held in place in the SF eyewear holder 2 or SF eyewear holder 22, the user may remove the eyewear 18 yet still have the eyewear 18 safely on their person.

Further, the individual wearing a garment 12 comprising the SF eyewear holder 2 or SF eyewear holder 22 cannot misplace or lose the SF eyewear holder 2 or SF eyewear holder 22 as it is an integral part of the garment 12. The SF eyewear holder 2 or SF eyewear holder 22 may be removed from the channel 10 of one garment 12 and threaded through the channel 10 of a different garment 12. Furthermore, as the adjustment sleeve 8 is moveable, the wearer may utilize the adjustment sleeve 8 for sensory stimulation, for example, as a stim toy. Additionally, the SF eyewear holder 2 or SF eyewear holder 22 may also be used to securely hold any lightweight items that may be inserted into, tied onto, clipped into, or clipped onto the pre-formed loop-shaped sections 6 or the newly formed loop 26 of the string fashioned from cording 4 such as suneyewear, keys, fidget toys, worry beads, security items, and the like.

Alternative embodiments are contemplated in which the SF eyewear holder 2 or SF eyewear holder 22 may be used for branding purposes. The cording of the string fashioned from cording 4 of the SF eyewear holder 2 or SF eyewear holder 22 may be of any color, such as a color associated with a particular brand, e.g., the signature teal blue color of Tiffany & Co. The adjustment sleeve 8 or loop-forming adjustment ring 24 secured to each of the termini of the string fashioned from cording 4 may be of the same or different color as the string fashioned from cording 4. Further, the string fashioned from cording 4, the adjustment sleeve 8, or both, may be manufactured with a design, such as a company name or logo. Likewise, the string fashioned from cording 4, loop-forming adjustment ring 24 secured to the termini of the string fashioned from cording 4, or both, may be manufactured with a design, such as a company name or logo.

Since many modifications, variations, and changes in detail can be made to the described embodiments and aspects of the disclosure, it is intended that all matters in the foregoing description and shown in the accompanying drawings be interpreted as illustrative and not in a limiting sense. Thus, the scope of the disclosure should be determined by the appended claims and their legal equivalents.

What is claimed is:

1. A sensory-friendly eyewear holder for providing sensory relief, comprising:
   a string comprising a first end and a second end, wherein each of the first end and second end comprises adjustable loop-shaped sections,
   wherein the string is a length of non-electroconductive cord comprising a first pre-formed loop-shaped section at the first end and a second preformed loop-shaped section at the second end,
   wherein the string further comprises an adjustment sleeve or collar adjacent to the first pre-formed loop-shaped section and the second preformed loop-shaped section to allow for size adjustment of a first pre-formed loop at the first pre-formed loop-shaped section and a second pre-formed loop at the second preformed loop-shaped section, and
   wherein the string is housed inside a casing or channel having two closed sides around a neck portion or a hood portion of a garment.

2. The sensory-friendly eyewear holder of claim 1, wherein
   the string comprises cording that is flat, round, semi-round, semi-flat, triangular, or square in cross-sectional conformation; and
   the cording comprises a material that is non-stretchable, partially stretchable, or fully stretchable.

3. The sensory-friendly eyewear holder of claim 1, wherein the adjustment sleeve adjacent to each pre-formed loop-shaped section comprises a material capable of varying the size of the loop as adjusted by a wearer to securely hold a pair of eyewear or other lightweight eyewear component.

4. The sensory-friendly eyewear holder of claim 3, wherein
   the shape of the adjustment sleeve or collar is oval, round, square, rectangular, triangular, or trapezoidal; and
   the adjustment sleeve or collar comprises a flexible or inflexible material allowing for secure adjustment of the size of the pre-formed loop.

5. The sensory-friendly eyewear holder of claim 4, wherein the adjustment sleeve or collar comprises a flexible material that is silicone, rubber, or flexible plastic.

6. The sensory-friendly eyewear holder of claim 4, wherein the adjustment sleeve or collar comprises an inflexible material that is wood, metal, silicone-lined wood, silicone-lined metal, inflexible silicone, inflexible rubber, or inflexible plastic.

7. The sensory-friendly eyewear holder of claim 4, wherein the adjustment sleeve or collar further comprises a spring mechanism.

8. A garment comprising the sensory-friendly eyewear holder of claim 1, wherein the casing or channel containing the string is integral to a hood attached to the garment, wherein the garment is a hoodie, vest, or jacket.

9. A garment comprising the sensory-friendly eyewear holder of claim 1, wherein the casing or channel containing the string is integral to the neck portion or the hood portion of a hooded garment.

10. A garment comprising the sensory-friendly eyewear holder of claim 1, wherein the casing or channel containing the string is integral to the neck portion of a hoodless garment.

11. A sensory-friendly eyewear holder for providing sensory relief, comprising:
    a string comprising a first end and a second end,
    wherein the string is a length of non-electroconductive cord comprising a first loop-forming adjustment ring secured to the first end and second loop-forming adjustment ring secured to the second end,
    wherein the first loop-forming adjustment ring allows arrangement of the cord to form a first loop and the second loop-forming adjustment ring allows arrangement of the cord to form a second loop,
    wherein the first loop-forming adjustment ring allows for size adjustment of the first formed loop and the second loop-forming adjustment ring allows for the size adjustment of the second formed loop,
    wherein the string is housed inside a casing or channel having two closed sides around a neck portion or a hood portion of a garment,
    thus, providing sensory relief to a wearer.

12. The sensory-friendly eyewear holder of claim 11, wherein
    the string comprises cording that is flat, round, semi-round, semi-flat, triangular, or square in cross-sectional conformation, and
    the cording comprises material that is non-stretchable, partially stretchable, or fully stretchable.

13. The sensory-friendly eyewear holder of claim 11, wherein the loop-forming adjustment ring secured to the first and second end of the string comprises a material capable of allowing for formation of a loop and securing the size of the loop as adjusted by the wearer to securely hold a pair of eyewear or other lightweight eyewear component.

14. The sensory-friendly eyewear holder of claim 13, wherein
    the loop-forming adjustment ring is oval, round, square, rectangular, triangular, or trapezoidal, and
    the loop-forming adjustment ring comprises a flexible or inflexible material allowing for secure adjustment of the size of the loop.

15. The sensory-friendly eyewear holder of claim 14, wherein the adjustment ring comprises a flexible material that is silicone, rubber, or flexible plastic.

16. The sensory-friendly eyewear holder of claim 14, wherein the adjustment ring comprises an inflexible material that is wood, metal, silicone-lined wood, silicone-lined metal, inflexible silicone, inflexible rubber, or inflexible plastic.

17. A garment comprising the sensory-friendly eyewear holder of claim 11, wherein the channel containing the string is integral to a hood attached to the garment, wherein the garment is a hoodie, vest, or jacket.

18. A garment comprising the sensory-friendly eyewear holder of claim 11, wherein the casing or channel containing the string is integral to the neck portion or the hood portion of a hooded garment.

19. A garment comprising the sensory-friendly eyewear holder of claim 11, wherein the channel containing the string is integral to the neck portion of a hoodless garment.

* * * * *